Sept. 27, 1949.  F. S. PERKERSON  2,482,931
BONDING OF RUBBER TO FIBROUS MATERIALS
Filed Dec. 6, 1944
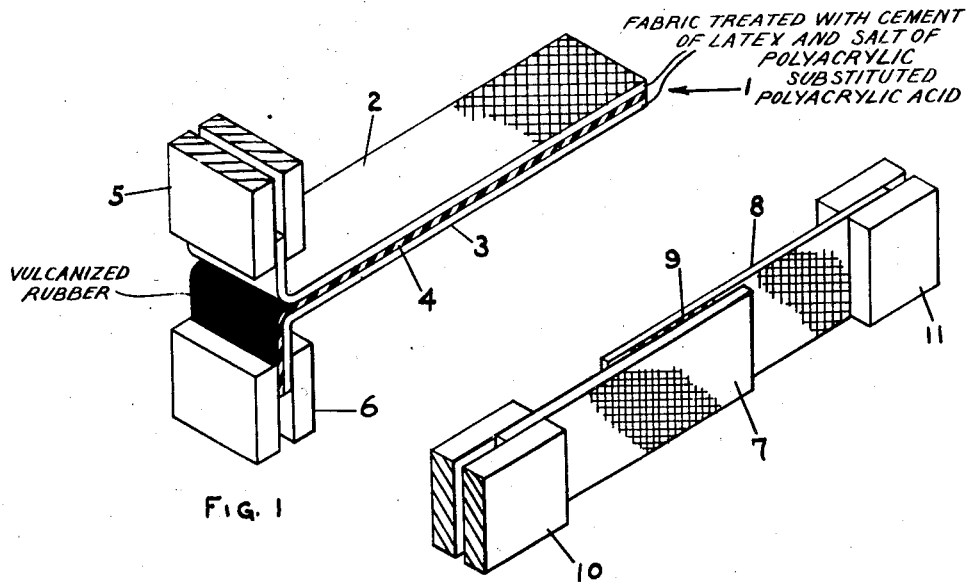
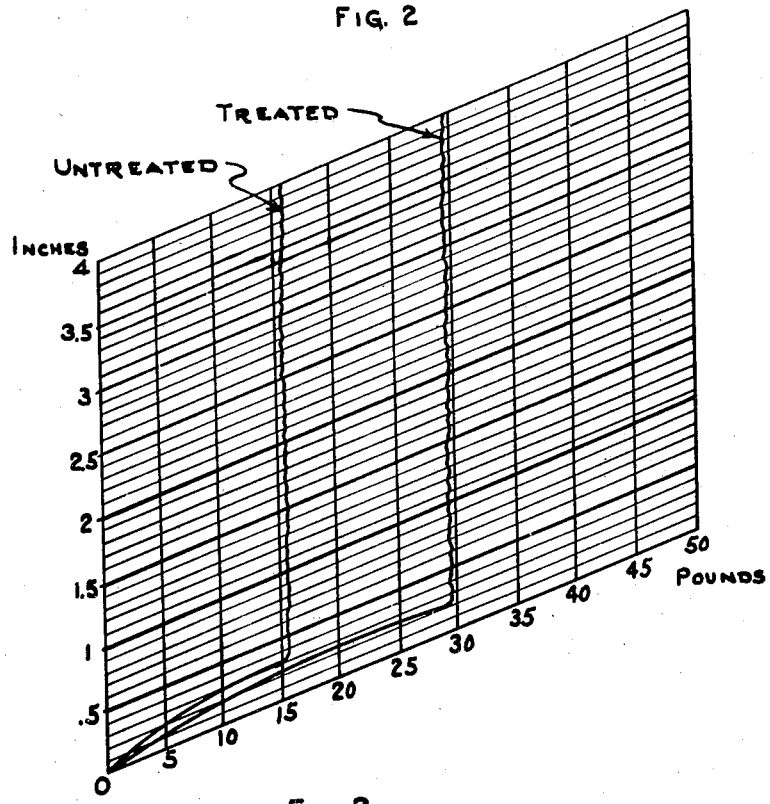
INVENTOR
FRED S. PERKERSON

UNITED STATES PATENT OFFICE 2,482,931

BONDING OF RUBBER TO FIBROUS MATERIALS

Fred S. Perkerson, La Grange, Ga., assignor, by mesne assignments, to Callaway Mills Company, La Grange, Ga., a corporation of Georgia Application December 6, 1944, Serial No. 566,881

13 Claims. (Cl. 154—139)

This invention relates to improvements in the bonding of rubber with fibrous materials and includes an improved method, an improved adhesive cement, improved treated fibrous material and improved composite vulcanized products.

More particularly, the invention relates to improvements in the bonding of rubber compositions to cotton and rayon fabrics used in tire carcasses and tire manufacture where adhesion of the vulcanized rubber composition and the tire fabric is important and with resulting improvement in the resulting cotton-rubber or rayon-rubber bond and increased serviceability of the tires.

According to the present invention the fibrous materials such as cotton or rayon fabrics used in tire construction are impregnated with rubber latex containing a latex-soluble salt of polyacrylic or polymethacrylic acid followed by drying of the treated fibrous materials and the application of vulcanizable rubber compositions thereto and subsequent vulcanization.

The fibrous materials used according to the invention include various fibrous materials to which it is desirable to impart improved adhesion with rubber. The invention is of special advantage in connection with tire fabrics of cotton and rayon and including both cords and cord fabrics and woven fabrics of cotton and rayon, etc.

The rubber latex used will contain, e. g., around 12% more or less of rubber solids and will in addition contain a small percentage of a water soluble salt of polyacrylic or polymethacrylic acid. The latex may be a natural rubber latex or a synthetic rubber latex, e. g., of Buna rubbers, neoprene, etc.

The salts of polyacrylic or polymethacrylic acid used in the latex are those which are soluble in the aqueous phase of the latex, particularly the alkali metal and ammonium salts. One such product is marketed under the trade name Rhotex Size by Rohm and Haas.

In carrying out the process of the invention the fibrous material such as a tire fabric is treated with the latex composition so as to coat or impregnate the fabric and the coated or impregnated fabric is then dried after which the vulcanizable rubber composition is applied thereto and the composite rubber-fabric product subjected to vulcanization.

The invention includes not only the improved process but the improved latex composition, the fibrous material treated therewith, and the final vulcanized product. The incorporation of the soluble salts of polyacrylic or polymethacrylic acid in the latex gives an improved latex or adhesive cement which enables improved adhesion between the fibrous material and rubber composition to be obtained. The impregnation of the fibrous material with the latex composition followed by drying of the impregnated fabric results in an improved treated fabric which enables improved adhesion to be obtained between the fabric and the rubber composition subsequently applied thereto.

The resulting composite product made with the treated fabric and with the application of vulcanizable rubber compositions followed by vulcanization is an improved product characterized by improved adhesion between the vulcanized rubber and treated fabric.

The advantages of the invention are illustrated by a comparison of final vulcanized products made according to the present invention with products similarly produced by treating fabrics with rubber latex which does not contain the salts of polyacrylic or polymethacrylic acid.

The improved products of the present invention show greatly increased bonding strength between the rubber and fibrous materials, e. g., when tested by the testing methods hereinafter referred to.

The rubber compositions which are bonded to the fabric will vary with the character of products produced. Such rubber compositions are well known in the art and are illustrated for example by so-called squeegee stocks and tire carcass stocks in which the rubber is compounded with the vulcanizing agents, accelerators, plasticizers, pigments, etc. with the particular formula varying somewhat with different tires and other products. The rubber compositions may be of natural rubber or of synthetic rubbers such as Buna rubbers, neoprene, etc.

While I do not desire to limit myself by any theoretical explanation of the improved result obtained by the present invention or of the action of the salts of polyacrylic or polymethacrylic acid used in the latex composition, I am led to believe that the presence of these salts in the latex and in the dried impregnated fabric gives an improved bond between the rubber of the latex and the fabric, possible due to the intimate association of the latex and the polyacrylate, which probably surrounds the latex particle as does the protein layer, and to the greater affinity of the polyacrylate salt for the fibrous material. Whatever the theoretical explanation may be, I have found that improved adhesion between fabric and the vulcanized rubber is obtained when the salts are incorporated in the latex used for impregnating the fabrics as compared with fabrics treated with latex which did not contain such salts.

The impregnation of the fabric with the latex composition may be improved or facilitated by a preliminary treatment of the fabric with agents which improve the wetting or penetration of the fabric by the latex, using, e. g., a preliminary treatment of the fabric with dilute alkali or with wetting, impregnating and stabilizing agents, e. g., sodium sulfates of higher fatty alcohols.

The invention will be further illustrated by the following examples:

Example 1.—A 36 oz. cotton belt duck was treated by immersing it in a rubber latex at 90° C., said latex having 12% rubber solids and with 2% of sodium polyacrylate added thereto and incorporated therein, this being added as a 15% paste. The resulting impregnated fabric was dried, a compounded vulcanizable rubber stock applied thereto, and the composite product cured under optimum conditions for the rubber stock used. To obtain comparative results the same fabric was similarly treated with the same 12% latex which did not have the sodium polyacrylate therein and it was found that a greatly increased adhesion was obtained with the product made with a latex containing the polyacrylate salt.

Example 2.—The same procedure described in Example 1 was followed except that spun viscose rayon duck was used instead of cotton duck and a similar improved adhesion between rubber and fabric was obtained.

Example 3.—Cotton duck was first pretreated by immersing in a hot aqueous solution containing 1% of the sodium salt of sulfated higher fatty alcohols (Tergitol 7) and 0.25% of sodium hydroxide and the pretreated fabric was allowed to air-dry overnight. The fabric was then immersed in a hot (90° C.) latex containing 12% rubber solids and 1% of sodium polyacrylate and the impregnated fabric was dried, compounded by applying a vulcanizable rubber composition and vulcanized. Tests were made of the resulting product in comparison with a product similarly made except for the omission of the sodium polyacrylate from the latex. An improved bonding of the rubber to the fabric was obtained in the products made with the latex containing the sodium polyacrylate.

The accompanying drawing illustrates in a somewhat conventional and diagrammatic manner two methods of testing the products of the invention with an illustration of the improved results obtained.

In the accompanying drawings—

Fig. 1 is a perspective view showing one test method;

Fig. 2 is a perspective view showing another test method; and

Fig. 3 shows a test chart obtained from a pendulum type recording testing machine.

In the test indicated in Fig. 1, a sample 1 is prepared and consists of two rectangular strips of fabric 2 and 3 with a strip of compounded rubber stock 4 therebetween. This sample is preferably cut to a width of one inch from a larger sample, the large sample having been previously cured under optimum conditions for the rubber stock used and maintained under constant pressure in a suitable press during the curing process. One of the ends of the small sample 1 has the fabrics 2 and 3 sufficiently separated so that they can be placed in the jaws 5 and 6 of a testing machine. The testing machine is preferably so designed as to record the pull required to separate the pieces of fabric 2 and 3. A chart illustrative of the results of a treated and untreated sample of cotton duck is shown in Fig. 3. The test shown in Fig. 1 may be referred to as the tear test.

Fig. 2 shows a second method of test. Two pieces of fabric 7 and 8 are overlapped with a narrow rubber strip 9 cured under pressure between the pieces of fabric 7 and 8 at the overlap. The free ends of the pieces 7 and 8 are placed in the jaws 10 and 11 of a testing machine and the amount of pull required to tear the strips 7 and 8 apart is measured. This test may be referred to as the overlap test.

In Fig. 3, which shows a typical result obtained with the tear test, it will be noted that a greatly increased tear strength is shown for the treated as compared with the untreated products. The particular degree of improvement will vary somewhat with different fabrics and different rubber compositions. The improved bonding strength between the fabric and rubber which the present invention makes possible is of special value in products such as automobile tires where the improved bond greatly increases the serviceability of the tires.

It will be understood that variations and modifications can be made in the invention and that the invention is not limited to the specific illustrative examples given.

I claim:

1. The method of improving the adhesion of rubber to a fibrous material which comprises applying an adhesive cement and a vulcanizable rubber compound to the said material and vulcanizing the rubber compound, said cement comprising rubber latex and a small percentage of a latex-soluble compound taken from the group consisting of salts of polyacrylic acid and salts of substituted polyacrylic acid.

2. The method of improving the adhesion of rubber to a cellulosic fibrous material which comprises applying an adhesive cement and a vulcanizable rubber compound to the said material and vulcanizing the rubber compound, said cement comprising rubber latex and a small percentage of a latex-soluble compound taken from the group consisting of salts of polyacrylic acid and salts of substituted polyacrylic acid.

3. The method of improving the adhesion of rubber to a fibrous material which comprises applying an adhesive cement to said material, drying the adhesive, applying a vulcanizable rubber compound to the said material and vulcanizing the rubber compound, said cement comprising rubber latex and a small percentage of a latex-soluble compound taken from the group consisting of salts of polyacrylic acid and salts of substituted polyacrylic acid.

4. The method of improving the adhesion of rubber to a cellulosic fibrous material which comprises applying an adhesive cement to said material, drying the adhesive, applying a vulcanizable rubber compound to the said material and vulcanizing the rubber compound, said cement comprising rubber latex and a small percentage of a latex-soluble compound taken from the group consisting of salts of polyacrylic acid and salts of substituted polyacrylic acid.

5. The method of improving the adhesion of rubber to a fibrous material which comprises applying an adhesive cement and a vulcanizable rubber compound to the said material and vulcanizing the rubber compound, said cement comprising rubber latex and a small percentage of a latex-soluble salt of polyacrylic acid.

6. The method of improving the adhesion of rubber to a cellulosic fibrous material which comprises applying an adhesive cement and a vulcanizable rubber compound to the said material and vulcanizing the rubber compound, said cement comprising rubber latex and a small percentage of a latex-soluble salt of polyacrylic acid.

7. The method of improving the adhesion of rubber to a fibrous material which comprises applying an adhesive cement to said material, drying the adhesive, applying a vulcanizable rubber compound to the said material and vulcanizing the rubber compound, said cement comprising rubber latex and a small percentage of a latex-soluble salt of polyacrylic acid.

8. The method of improving the adhesion of rubber to a cellulosic fibrous material which comprises applying an adhesive cement to said material, drying the adhesive, applying a vulcanizable rubber compound to the said material and vulcanizing the rubber compound, said cement comprising rubber latex and a small percentage of a latex-soluble salt of polyacrylic acid.

9. The method of improving the adhesion of rubber to a fibrous material which comprises applying an adhesive cement and a vulcanizable rubber compound to the said material and vulcanizing the rubber compound, said cement comprising rubber latex and a latex-soluble salt of substituted polyacrylic acid.

10. The method of improving the adhesion of rubber to a cellulosic fibrous material which comprises applying an adhesive cement and a vulcanizable rubber compound to the said material and vulcanizing the rubber compound, said cement comprising rubber latex and a latex-soluble salt of substituted polyacrylic acid.

11. The method of improving the adhesion of rubber to a fibrous material which comprises applying an adhesive cement to said material, drying the adhesive, applying a vulcanizable rubber compound to the said material and vulcanizing the rubber compound, said cement comprising rubber latex and a small percentage of a latex-soluble salt of substituted polyacrylic acid.

12. The method of improving the adhesion of rubber to a cellulosic fibrous material which comprises applying an adhesive cement to said material, drying the adhesive, applying a vulcanizable rubber compound to the said material and vulcanizing the rubber compound, said cement comprising rubber latex and a small percentage of a latex-soluble salt of substituted polyacrylic acid.

13. A composite vulcanized rubber product including fibrous material bonded to vulcanized rubber made in accordance with the method set forth in claim 1.

FRED S. PERKERSON.

REFERENCES CITED

The following references are of record in the file of this patent:

UNITED STATES PATENTS

| Number | Name | Date |
|---|---|---|
| 1,976,679 | Fikentscher | Oct. 9, 1934 |
| 2,078,881 | Munzinger | Apr. 27, 1937 |
| 2,211,945 | Charch | Aug. 20, 1940 |
| 2,211,960 | Meigs | Aug. 20, 1940 |
| 2,224,679 | Hershberger | Dec. 10, 1940 |
| 2,291,700 | Dreyfus | Aug. 4, 1942 |

FOREIGN PATENTS

| Number | Country | Date |
|---|---|---|
| 788,987 | France | Oct. 21, 1935 |